US012343692B2

(12) United States Patent
Kotimäki et al.

(10) Patent No.: US 12,343,692 B2
(45) Date of Patent: Jul. 1, 2025

(54) COUNTER-FLOW REACTANT MIXING FOR EXHAUST GAS AFTERTREATMENT

(71) Applicant: Proventia Oy, Oulunsalo (FI)

(72) Inventors: Eero Kotimäki, Oulunsalo (FI); Jukka Kurikka, Oulunsalo (FI); Aki Kärnä, Oulunsalo (FI); Tuomas Tyni, Oulunsalo (FI)

(73) Assignee: Proventia Oy, Oulunsalo (FI)

( * ) Notice: Subject to any disclaimer, the term of this patent is extended or adjusted under 35 U.S.C. 154(b) by 78 days.

(21) Appl. No.: 18/064,791

(22) Filed: Dec. 12, 2022

(65) Prior Publication Data
US 2023/0191342 A1 Jun. 22, 2023

(30) Foreign Application Priority Data

Dec. 16, 2021 (FI) .................................... 20216288

(51) Int. Cl.
*B01F 25/31* (2022.01)
*B01D 53/79* (2006.01)
(Continued)

(52) U.S. Cl.
CPC .......... *B01F 25/3131* (2022.01); *B01D 53/79* (2013.01); *B01F 23/2132* (2022.01);
(Continued)

(58) Field of Classification Search
CPC ...... F01N 3/2892; F01N 3/2066; F01N 3/021; F01N 3/035; F01N 2240/20;
(Continued)

(56) References Cited

U.S. PATENT DOCUMENTS 10,612,442 B2  4/2020  Boldt et al.
2012/0090305 A1  4/2012  Floyd et al.
(Continued)

FOREIGN PATENT DOCUMENTS

CN  101191425 A  *  6/2008
CN  113482748 A     10/2021
(Continued)

OTHER PUBLICATIONS

Finnish Patent and Registration Office, Search Report, Application No. 20216288, Mailed Apr. 21, 2022, 2 pages.
(Continued)

*Primary Examiner* — Kenneth J Hansen
*Assistant Examiner* — Kelsey L Stanek
(74) *Attorney, Agent, or Firm* — Ziegler IP Law Group, LLC.

(57) ABSTRACT

A mixer and a method therein, including feeding a rotating flow of exhaust gas in a mixing pipe towards a turning end of a mixing chamber; dosing reactant by a doser against the rotating flow around a centreline of the mixing pipe; maintaining a guide around the doser such that a front face of the guide faces the rotating flow, and the guide defines a central opening surrounding the doser; guiding a side flow out of the rotating flow to a carrier flow around the doser via the central opening; and inhibiting by the guide turbulence from being transferred from the side flow to the carrier flow.

17 Claims, 7 Drawing Sheets

(51) Int. Cl.
  *B01F 23/213* (2022.01)
  *B01F 25/10* (2022.01)
  *B01F 25/313* (2022.01)
  *B01F 35/00* (2022.01)
  *B01F 25/00* (2022.01)

(52) U.S. Cl.
  CPC ............ *B01F 25/103* (2022.01); *B01F 35/55* (2022.01); *B01F 2025/918* (2022.01)

(58) Field of Classification Search
  CPC ........... F01N 2610/02; F01N 2610/068; F01N 13/0097; Y02T 10/12; B01F 25/3131; B01F 25/4332; B01F 25/103; B01F 2025/918; B01F 2025/915; B01F 2025/913; B01F 2025/931; B01D 53/79; B01D 53/90
  USPC .......................................... 60/324; 366/165.2
  See application file for complete search history.

(56) References Cited

U.S. PATENT DOCUMENTS

| | | | | |
|---|---|---|---|---|
| 2016/0047288 | A1* | 2/2016 | Arrowsmith | F01N 3/206 60/274 |
| 2018/0326372 | A1* | 11/2018 | Tyni | B01F 23/213 |
| 2021/0285355 | A1* | 9/2021 | Dimpelfeld | F01N 3/2066 |

FOREIGN PATENT DOCUMENTS

| | | |
|---|---|---|
| EP | 2465602 A2 | 6/2012 |
| EP | 3327263 A1 | 5/2018 |
| JP | 2013160224 A | 8/2013 |

OTHER PUBLICATIONS

European Patent Office, Extended European Search Report, Application No. 22212130.3-1017, dated May 16, 2023, 7 pages.

\* cited by examiner

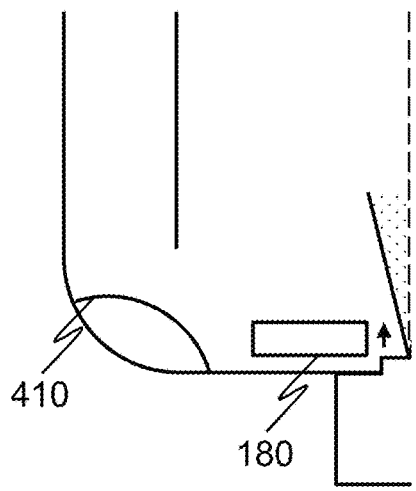
Fig. 4a  400
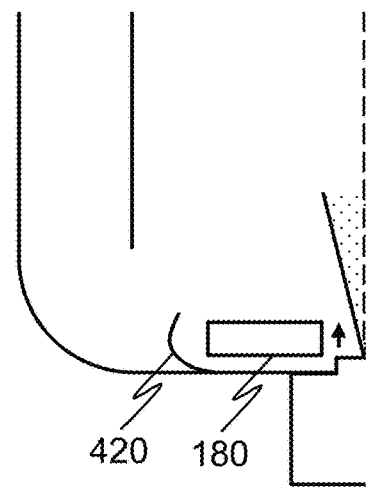
Fig. 4b  400'
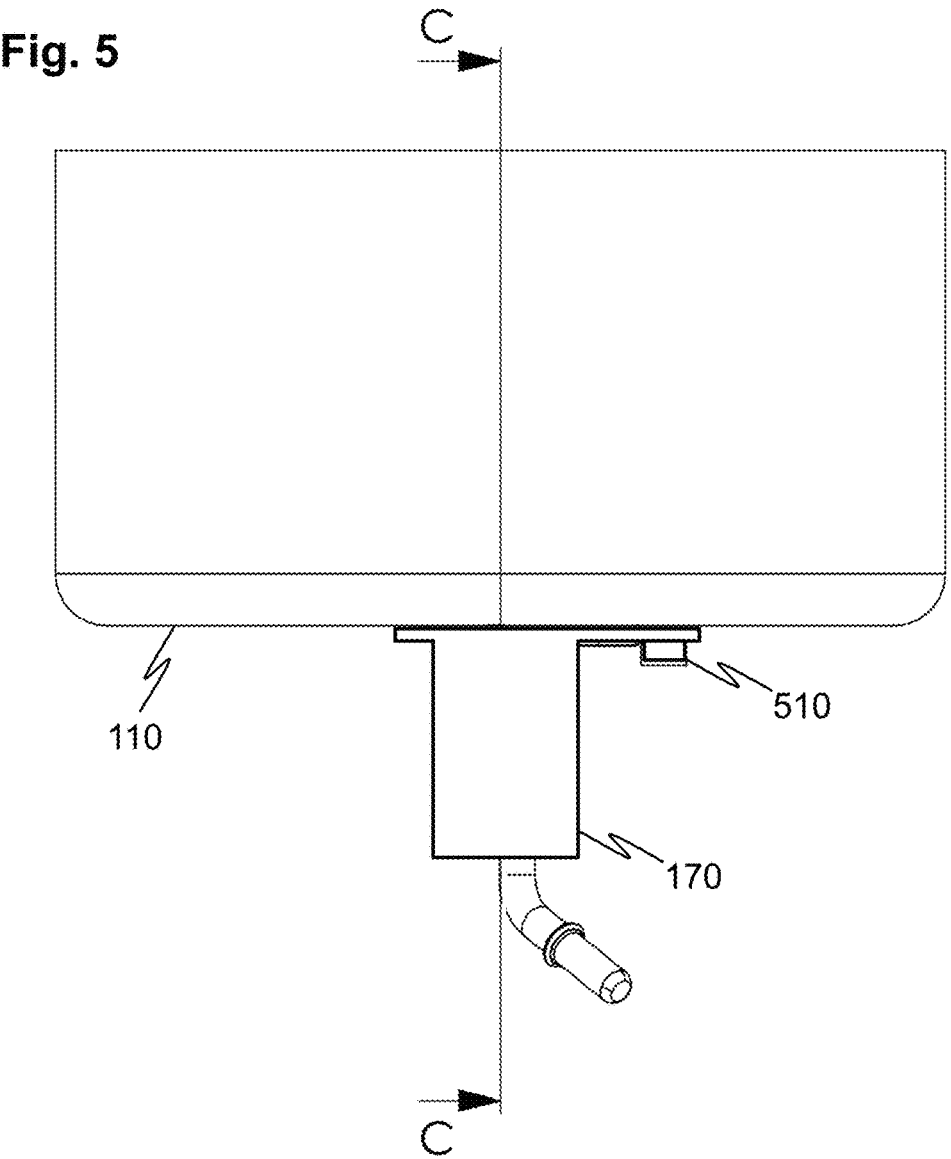
Fig. 5

Fig. 8

800: feeding a rotating flow of exhaust gas in a mixing pipe towards a turning end of a mixing chamber 801: dosing reactant by a doser against the rotating flow around a centreline of the mixing pipe 802: maintaining a guide around the doser such that a front face of the guide faces the rotating flow and the guide defines a central opening surrounding the doser 803: forming a pressure difference between a periphery of the guide and the mixing chamber around the guide 804: guiding a side flow out of the rotating flow to a carrier flow around the doser via the central opening, e.g., using the pressure difference 805: inhibiting by the guide turbulence from being transferred from the side flow to the carrier flow 806: forming the pressure difference by a geometry of the mixer 807: forming the pressure difference by throttling the main flow downstream from the guide 808: inhibiting the turbulence by guiding the side flow via guide channels that feed the side flow by a plurality of radial outputs to the central opening 809: inhibiting the turbulence so that the carrier flow is laminar around the doser

Fig. 11

| 1100: feeding a rotating flow of the first portion of exhaust gas in the mixing pipe towards a turning end of a mixing chamber |

| 1101: dosing reactant by a doser against the rotating flow around a centreline of the mixing pipe |

| 1102: maintaining a guide around the doser such that a front face of the guide faces the rotating flow, and the guide defines a central opening surrounding the doser |

| 1103: guiding exhaust gas to a carrier flow around the doser via the central opening |

| 1104: upstream from the feeding of the rotating flow of the first portion in the mixing pipe, branching a first portion exhaust gas supply partly to a mixing pipe and a second branch to a carrier flow input |

| 1105: guiding exhaust gas from the carrier flow input to the carrier flow |

| 1106: guiding a side flow out of the rotating flow through the central opening to the carrier flow |

| 1107: inhibiting the turbulence by guiding the side flow via guide channels that feed the side flow by a plurality of radial outputs to the central opening. |

COUNTER-FLOW REACTANT MIXING FOR EXHAUST GAS AFTERTREATMENT

TECHNICAL FIELD

The present disclosure generally relates to counter-flow reactant mixing for exhaust gas aftertreatment. The disclosure relates particularly, though not exclusively, to air-free reactant mixing in a counter-flow mixer for exhaust gas aftertreatment.

BACKGROUND

This section illustrates useful background information without admission of any technique described herein representative of the state of the art.

In exhaust gas after treatment, reactant such as urea liquid is typically sprayed into exhaust gas. When compressed air can be used, the urea liquid may be relatively easily dispersed into minute droplets. However, there are advantages in using air-free dispensing of the reactant, such as avoiding the need to use a compressor and reducing energy consumption by spraying the reactant as such without a gas phase carrier. However, on spraying the reactant, some portion of the reactant tends to start accruing around the tip and body of a reactant doser.

Numerous attempts have been made to reduce accrual of the reactant on any surfaces in of a mixer, while avoiding pressure build-up and deterioration of mixing efficiency, among others. New better or alternative implementations are needed for the mixing of reactant in the exhaust gas aftertreatment.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the disclosed embodiments.

According to a first example aspect there is provided a method in a mixer, comprising
  feeding a rotating flow of exhaust gas in a mixing pipe towards a turning end of a mixing chamber;
  dosing reactant by a doser against the rotating flow around a centreline of the mixing pipe;
  maintaining a guide around the doser such that a front face of the guide faces the rotating flow, and the guide defines a central opening surrounding the doser;
  guiding a side flow out of the rotating flow to a carrier flow around the doser via the central opening; and
  inhibiting by the guide turbulence from being transferred from the side flow to the carrier flow.

The doser may be an air-free doser.

The method may further comprise forming a pressure difference between a periphery of the guide and the mixing chamber around the guide.

The side flow may be guided out of the rotating flow using the pressure difference to the carrier flow around the doser via the central opening.

The pressure difference may be formed by a geometry of the mixer. The geometry of the mixer may cause a majority of the main flow to turn around an output end of the mixing pipe such that a first portion of the turning flow closer to the guide has a lower velocity than a second portion of the turning flow farther apart from the guide, for incurring a higher pressure in the first portion than a pressure in the central opening.

The pressure difference may be formed by throttling the main flow downstream of the guide.

The inhibiting of the turbulence may be performed by guiding the side flow via guide channels feeding the side flow by a plurality of radial outputs to the central opening. The inhibiting of turbulence may make the carrier flow laminar around the doser.

The guide channels may be defined by a plurality of wings that are radially extending from the central opening. The wings may have back-side fairings configured to reduce turbulence. The wings may have planar front-sides. The front-sides may be directed against rotation of the rotating flow. The front-sides may be at an angle with relation to a radial direction such that front-side is turned at a peripheral end towards incoming gas flow.

All or at least some of the wings may extend to a periphery of the guide. All or at least some of the wings may be inset from the periphery of the guide. All or at least some of the wings may be inset from the periphery of the guide by at least 1%; 2%; 5%; 10%; or 20% of local radius. All or at least some of the wings may be inset from the periphery of the guide by at most 2%; 5%; 10%; 20%, or 30% of local radius. The local radius may refer to a distance from a given point of the periphery of the guide to a centre of the guide when seen in an axial direction of the mixing pipe.

All or at least some of the wings may extend to the central opening. All or at least some of the wings may be inset from the central opening. The inset from the central opening may be at least 1%; 2%; 5%; 10%; or 20% of local radius. The inset from the central opening may be at most 2%; 5%; 10%; 20%, or 30% of local radius.

All or at least some of the wings may define fixing holes. The fixing holes may be pitched for bolts. One or more of the wings that accommodate fixing holes may be expanded to accommodate respective fixing holes. The fixing holes may reside rotation symmetrically. Alternatively, the fixing holes may reside rotation asymmetrically. The fixing holes may reside at constant distance from the central opening. Alternatively, all, or at least some of the fixing holes may reside at different distances from the central opening.

The fixing holes may be configured to enable mounting of the doser. The doser may be mounted by bolts such that the turning end of the mixing chamber is compressed between the doser and the guide. The compressing may be performed with bolts tightened through a base of the doser and through the turning end to the fixing holes. Alternatively, the guide may comprise threaded rods instead of all or at least some of the fixing holes. The threaded rods may be directed towards and through the turning end and the base of the doser. All or at least some of the threaded rods may be integrally formed with the guide. All or at least some of the threaded rods may be machined to cast protrusions in the guide. All or at least some of the threaded rods may be welded to the guide. All or at least some of the threaded rods may be screwed to threads in the fixing holes.

The guide may define a disc. The disc may be separated by the wings from the turning end of the mixing chamber. The disc may be supported by the wings. The disc may define the guide channels on one side. The turning end may define the guide channels on another side.

The front face of the guide may be concave. Alternatively, the front face may be planar. Further alternatively, the front face may have a planar portion and a concave portion. The planar portion may reside between the central opening and the concave portion.

The mixing pipe may be cylindrical. Alternatively, the mixing pipe may be conical. The mixing pipe may have a radius increasing towards the output end of the mixing pipe.

The mixing chamber may be cylindrical. The mixing pipe may be coaxial with the mixing chamber. The doser may be configured to dose the reactant coaxially with the mixing pipe. The central opening may reside coaxially with the mixing pipe. The disc may reside coaxially with the mixing pipe.

The central opening may comprise a cylindrical portion. The central opening may comprise a conical portion. The central opening may have a rounded edge on an input side. The central opening may have a rounded edge on an output side.

The central opening may reside at a centre of the disc. Alternatively, the central opening may reside with an offset from the centre of the disc. The central opening may be displaced from the centre of the disc to compensate uneven pressure distribution around the disc.

The disc may have a circular periphery. Alternatively, the disc may have a varying radius. The radius of the disc may vary to compensate uneven pressure distribution around the disc.

The turning end of the mixing chamber may have a planar central section. The planar central section may join to a peripheral wall of the mixing chamber by an intermediate portion. The intermediate portion may be concave. The intermediate portion may extend over a portion of a radius of the peripheral wall when measured at the tip of the doser. The portion of the radius may be at least 1%; 2%; 5%; or 10%. The portion of the radius may be at most 2%; 5%; 10%; or 20%. The portion may have a constant radius.

The output end of the mixing pipe may reside at an axial distance from the turning end and at a radial distance from the peripheral wall. The axial distance may be at least 50%; 70%; 80%; 90%; 100%; or 110% of the radial distance. The axial distance may be at most 80%; 90%; 100%; 110%; or 150% of the radial distance.

The throttling may result in a flow passage having a cross-sectional surface area at most 90%; 80%, 60%, 50%, or 30% of a cross-sectional surface area of the mixing pipe at the output end.

According to a second example aspect there is provided a mixer for exhaust gas aftertreatment, comprising
- a feed configured to feed a rotating flow of exhaust gas in a mixing pipe towards a turning end of a mixing chamber;
- a doser configured to dose reactant against the rotating flow around a centreline of the mixing pipe;
- a guide around the doser such that a front face of the guide faces the rotating flow, and the guide defines a central opening surrounding the doser;
- the guide comprising a passage structure for guiding a side flow out of the rotating flow using the pressure difference to a carrier flow around the doser via the central opening; and
- the passage structure being configured to inhibit turbulence from being transferred from the side flow to the carrier flow.

The mixer may further comprise a pressure structure configured to form a pressure difference between a periphery of the guide and the mixing chamber around the guide.

The passage structure may be configured to guide the side flow out of the rotating flow using the pressure difference to a carrier flow around the doser via the central opening.

According to a third example aspect there is provided an exhaust gas treatment system. The system may comprise the mixer of the second example aspect. The system may comprise a diesel oxidation catalysts, DOC. The system may comprise a diesel particulate filters, DPF. The system may comprise a selective catalytic reduction, SCR, catalyst.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 4a shows an arrangement for causing a pressure differential that produces a carrier flow around a doser, according to an example embodiment;

FIG. 4b shows an arrangement for splitting a side flow for producing a carrier flow around a doser, according to an example embodiment;

FIG. 5 shows a view of a doser when mounted to the mixer, according to an example embodiment;

FIG. 8 shows a flow chart according to an example embodiment;

FIG. 11 shows a flow chart of a method in a mixer according to an example embodiment.

DETAILED DESCRIPTION

In the following description, like reference signs denote like elements or steps.

Figure 1:
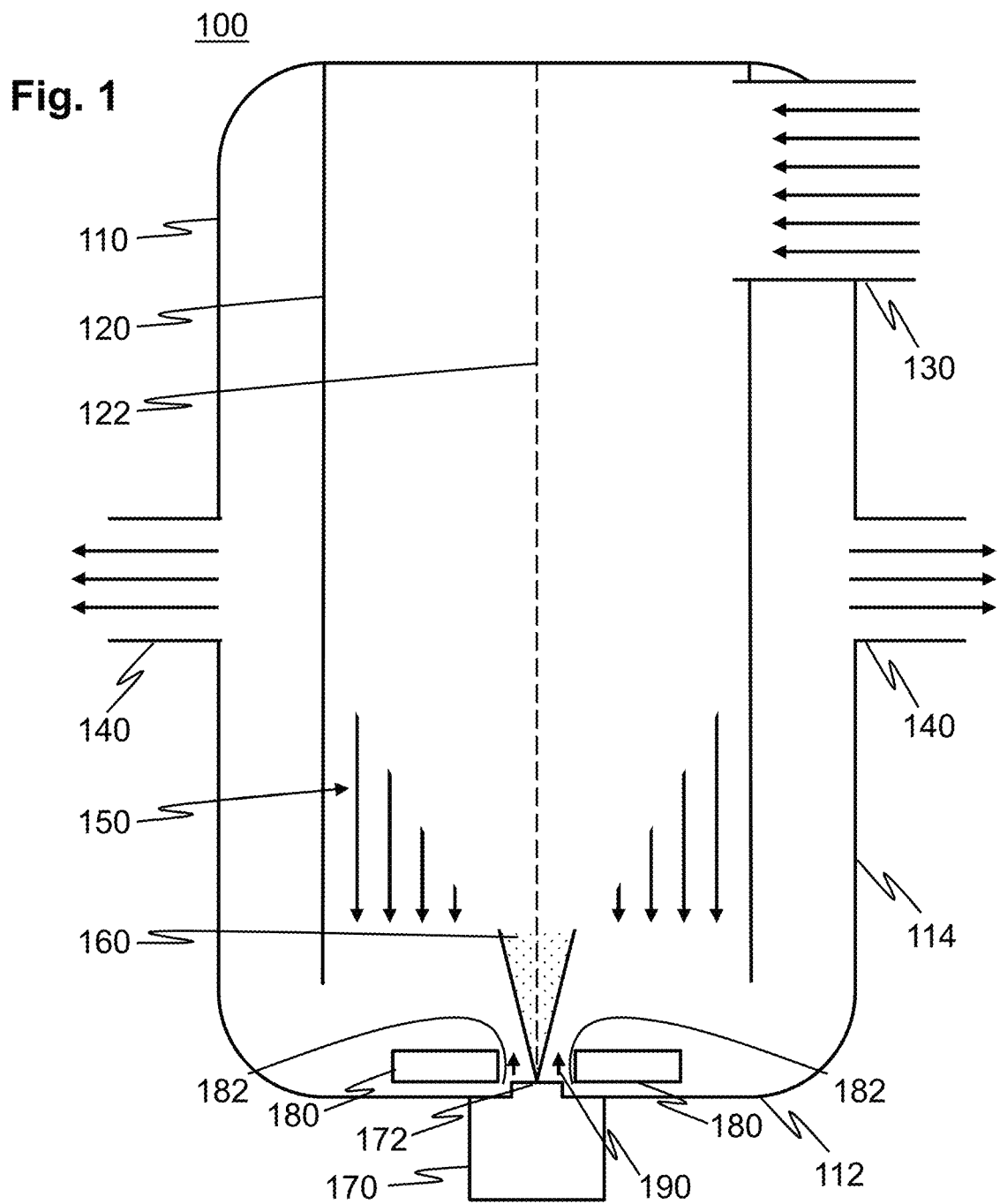
FIG. 1 schematically shows simplified sectional drawing of an exhaust mixer for aftertreatment, according to an example embodiment.

FIG. 1 schematically shows an exhaust mixer 100 for aftertreatment, according to an example embodiment. The mixer comprises a mixing chamber 110 that houses a mixing pipe 120. The mixer further comprises an input 130 and an output 140, here formed of two outlets. The input 130 is implemented in FIG. 1 by a conduit leading exhaust gas tangentially to the mixing pipe 120 so forming a rotating main flow 150 into the mixing pipe 120. The rotating main flow advances towards a turning end 112 of the mixing chamber 110. The mixing chamber of FIG. 1 is cylindrical and so the mixing chamber has a peripheral wall 114 that is cylindrical. In another example embodiment, the mixing chamber has a different shape, such as an oval or elliptic shape.

In an example embodiment, the rotation of the main flow 150 is produced by other swirl structures instead of or in addition to the swirl producing input 130 that is used in this embodiment, such as a propeller formed swirl guide (not shown).

The rotation of the main flow 140 centrifugally packs the main flow against an inner wall of the mixing pipe 120. A lower pressure prevails around a centreline 122 of the mixing pipe. This effect is made used to enhance dosing reactant 160 by a doser 170 from a doser tip 172 against the main flow around the centreline 122, with greatly reduced counterflow against the doser. However, it is typical that some accrual of reactant begins to build up on the doser 170 possibly because of turbulences and/or imperfect dosing at start and end of the dosing of reactant. To this end, a carrier flow 190 is formed using a guide 180 positioned around the doser 170, through a central opening 182 defined by the guide around the doser 170.

Here, around refers to that the guide extends radially from the doser 170 on a portion of the length of the doser 170 in the mixing chamber 110, not that the guide 180 should enclose the entire doser 170.

The carrier flow is produced in an example embodiment by forming a pressure difference in the mixing chamber around the guide 180, as further described referring to FIGS. 3 and 4.

FIG. 1 shows only schematically one example embodiment. Various details can be freely modified. In FIG. 1, arrows roughly illustrate mass flow.

The doser 170 of FIG. 1 is an air-free doser. Thus, the doser 170 outputs the reactant without using air as a carrier. In an alternative embodiment, the doser 170 uses a carrier gas to dose the reactant.

Figure 2:
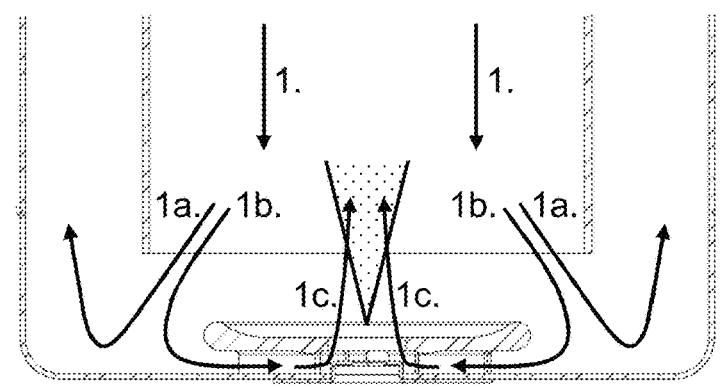
FIG. 2 shows some details of the mixer of FIG. 1 and an illustration of some flows in the mixer.

FIG. 2 shows some details of the mixer of FIG. 1 and an illustration of some flows in the mixer. The main flow 150 of FIG. 1 arrives in a mixing region as a first flow 1. The first flow 1 is mostly directed as a first sub-flow towards the output 140 of FIG. 1 around an output end of the mixing pipe. A second sub-flow directs a minority of the first flow through the guide and its central opening to a carrier flow 1c around the doser for inhibiting accrual of the reactant on the doser.

Figure 3A:
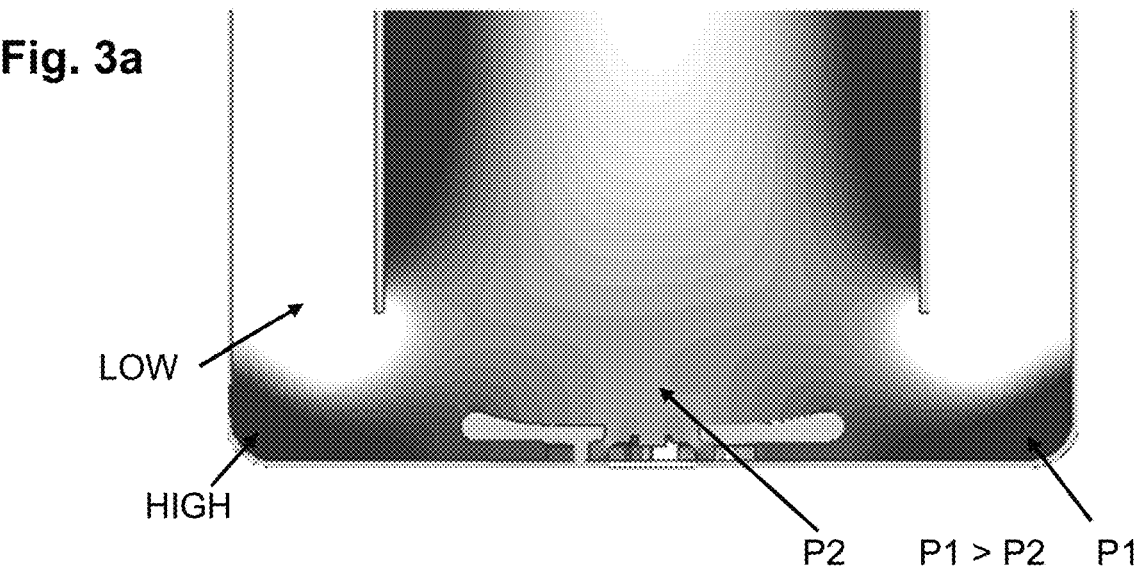
FIGS. 3a and 3b show simulated pressures of exhaust gas in the mixer.
Figure 3B:
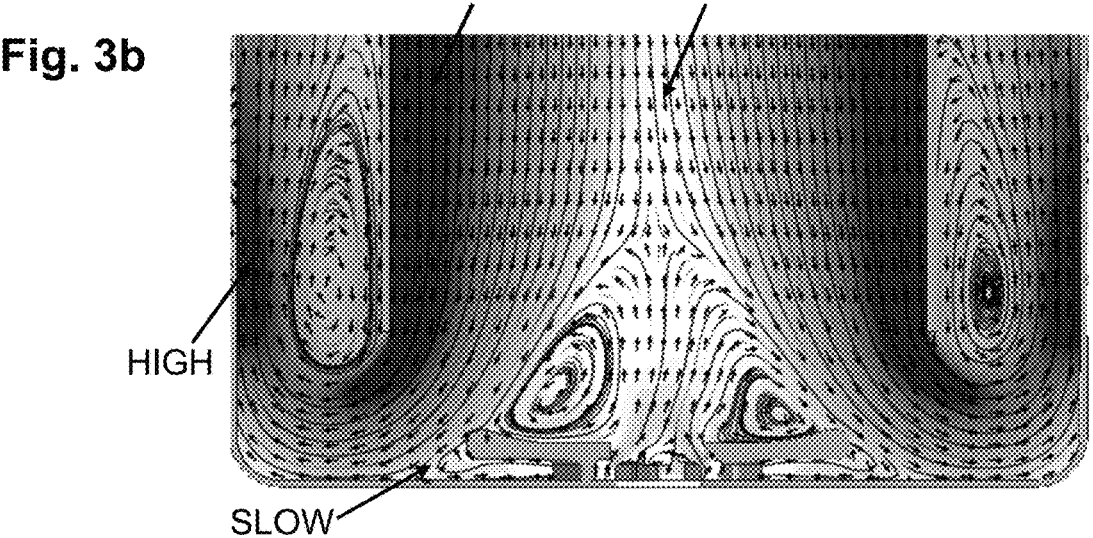

FIG. 3a shows simulated pressures of exhaust gas in the mixer and FIG. 3b shows simulated velocities of exhaust gas in the mixer. A pressure difference is formed in this example embodiment by a geometry of the mixer. The geometry of the mixer cause a majority of the main flow to turn around the output end of the mixing pipe such that a first portion of the turning flow closer to the guide has a lower velocity than a second portion of the turning flow farther apart from the guide, for incurring a higher pressure in the first portion than a pressure in the central opening.

FIG. 4a shows a throttling arrangement 400 for causing a pressure differential that produces the carrier flow around a doser, according to an example embodiment. In comparison to the mixer 100 of FIG. 1, in this arrangement, there is a throttling formed by throttling elements 410 that form a throttling structure. In result, the pressure difference is formed so that the carrier flow is induced. In another alternative, the dimensioning of a passage between the turning end of the mixing chamber and the output end of the mixing pipe produces a suitable throttling to induce the pressure difference.

FIG. 4b shows a splitting arrangement 400 for splitting a side flow by a splitting element 420 for producing the carrier flow around a doser, according to an example embodiment.

FIGS. 4a and 4b show only one side of the mixing chamber at the turning end 112. The remaining side can be similar or different. For example, there may be one or more throttling elements and one or more splitting elements 420 for collectively forming the carrier flow around the doser.

FIG. 5 shows a view of a doser when mounted to the mixer, according to an example embodiment. The doser 170 is mounted to the mixing chamber with bolts 510.

Figure 6:
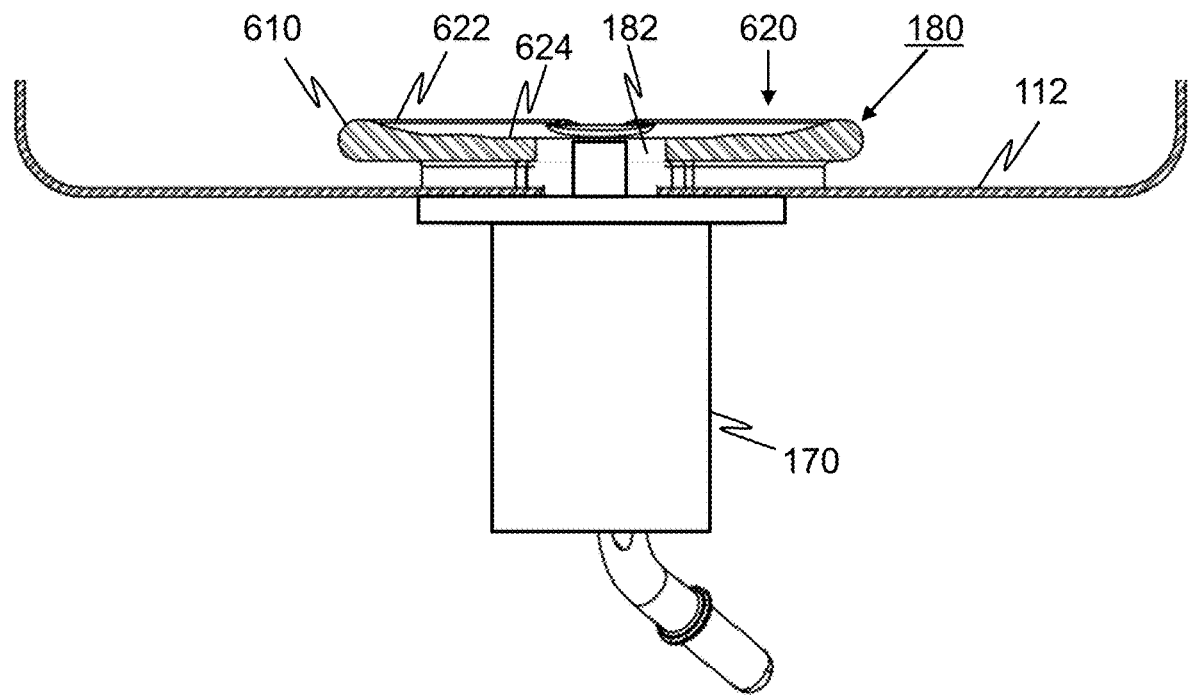
FIG. 6 shows a section view of a guide, doser, and turning end of a mixer, according to an example embodiment.

FIG. 6 shows a section view of the guide, doser, and turning end of FIG. 5. The guide 180 comprises a disc 610 and a stem part 620 that forms a flow passage from around the guide 180 to the central opening 182. The disc has a front face 620 that facing away from the turning end 112. The front face 620 may have at least one concave portion 622. Alternatively, or additionally, the front face 620 may have at least one planar portion 624.

Figure 7:
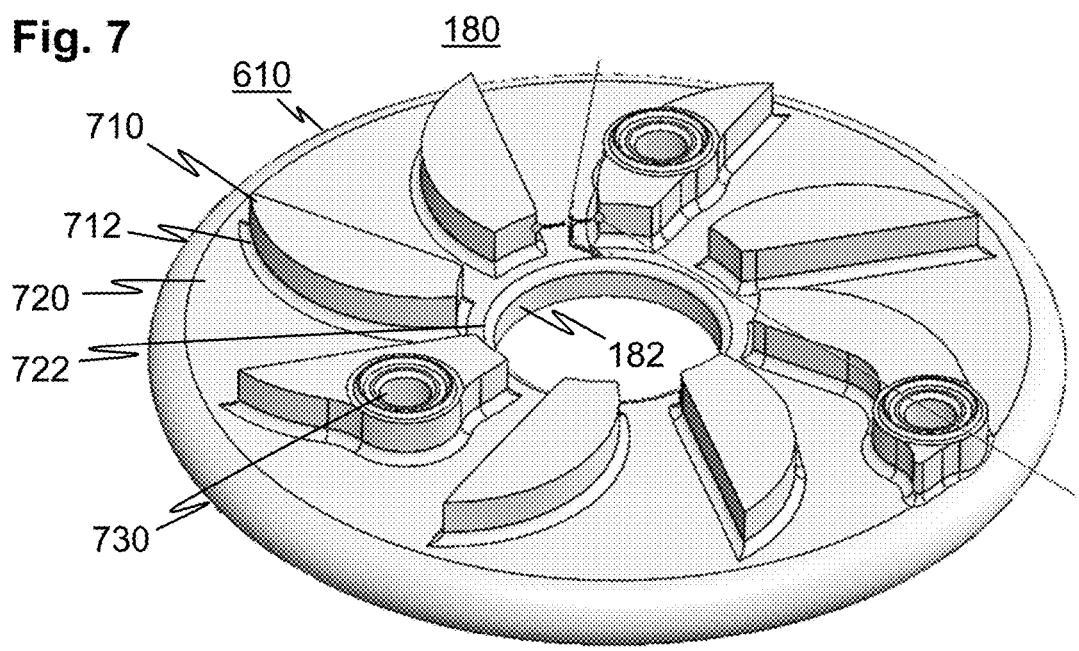
FIG. 7 shows the guide of FIG. 6 from behind.

FIG. 7 shows the guide of FIG. 6 from behind. A plurality of wings 710 are provided on the backside 720 of the disc 610, i.e., between the disc 610 and the turning end 112. The wings comprise fairings 712 on a backside.

In another example embodiment the wings are formed to the turning end 112, but it is easier to form the wings to the guide 180. In an example embodiment, the doser 170 is mounted by three bolts such that the doser 170 can be mounted in only one angle. A base of the doser is formed to provide bolt holes and the guide defines corresponding guide holes 730. The guide holes 730 can be threaded so that the doser can be bolted through the turning end to the guide 180. Alternatively, the guide 180 can be fitted with protruding threaded bars or bolts such that the doser 170 is attached with nuts.

In FIG. 7, the wings are equidistantly arranged with equal inset at radially inner and outer ends. Some of the wings are locally expanded to form the guide holes with sufficient wall thickness. The wings are wing shaped, as they comprise fairings configured to reduce turbulence on a rear side in view of incoming exhaust gas. A facing side or front face of the wings is here planar. Alternatively, the front face may have a concave portion. The front face may be at an turned towards incoming gas flow in comparison to a radial direction. An The angle between the front face and a radius of the disc 610 may be at most 5; 10; or 20 degrees.

FIG. 7 shows a rounding or a bezel 722 formed on the back face 720 in an input edge of the central opening 182.

FIG. 8 shows a flow chart according to an example embodiment illustrating a process comprising various possible steps including some optional steps while also further steps can be included and/or some of the steps can be performed more than once:

800: feeding a rotating flow of exhaust gas in a mixing pipe towards a turning end of a mixing chamber;

801: dosing reactant by a doser against the rotating flow around a centreline of the mixing pipe;

802: maintaining a guide around the doser such that a front face of the guide faces the rotating flow, and the guide defines a central opening surrounding the doser;

803: forming a pressure difference between a periphery of the guide and the mixing chamber around the guide;

804: guiding a side flow out of the rotating flow to a carrier flow around the doser via the central opening, e.g., using the pressure difference;

805: inhibiting by the guide turbulence from being transferred from the side flow to the carrier flow;

806: forming the pressure difference by a geometry of the mixer;

807: forming the pressure difference by throttling the main flow downstream of the guide;

808: inhibiting the turbulence by guiding the side flow via guide channels that feed the side flow by a plurality of radial outputs to the central opening; and/or 809: inhibiting the turbulence so that the carrier flow is laminar around the doser.

Figure 9:
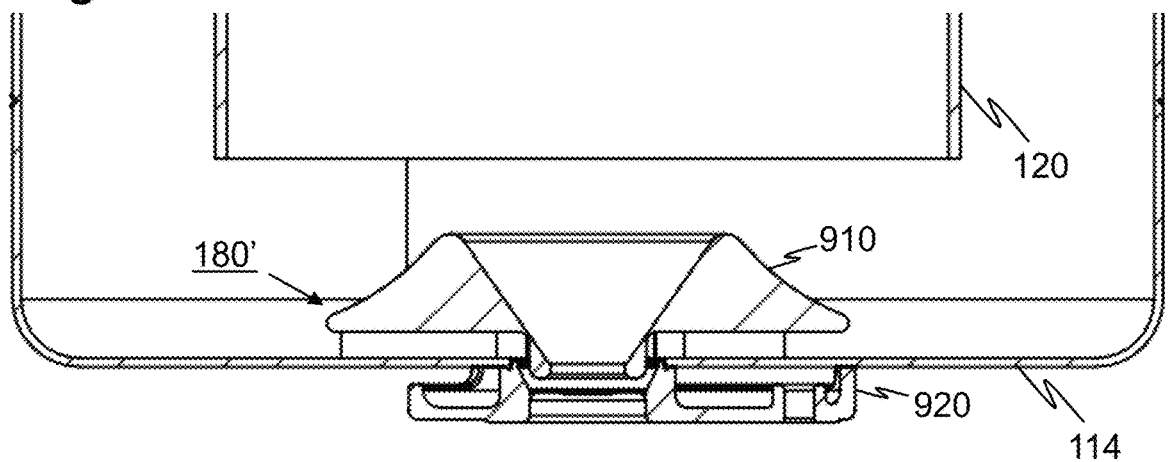
FIG. 9 shows a guide of another example embodiment with an external doser mounting.

FIG. 9 shows a guide 180' of another example embodiment with an external doser mount 920 for doser attachment. The external doser mount 920 can be attached to the mixing chamber 114 in various ways. For example, the doser mount 920 may be welded to the mixing chamber 114, bolted or riveted through the mixing chamber 114 to the guide 180', or attached by bolts or screws to the mixing chamber 114.

FIG. 9 shows an alternative mixing pipe side shape in the guide 180'. Here, the guide 180' comprises a cone 910 towards the mixing pipe 120. The cone 910 may have straight inner surfaces. The cone 910 may have also a straight outer slope. Here, the cone 910 has curved outer slope for reducing turbulence of a flow that passes by the guide 180'.

Alternatively, the guide of any other example embodiment can be used in conjunction with the external doser mount 920.

Figure 10:
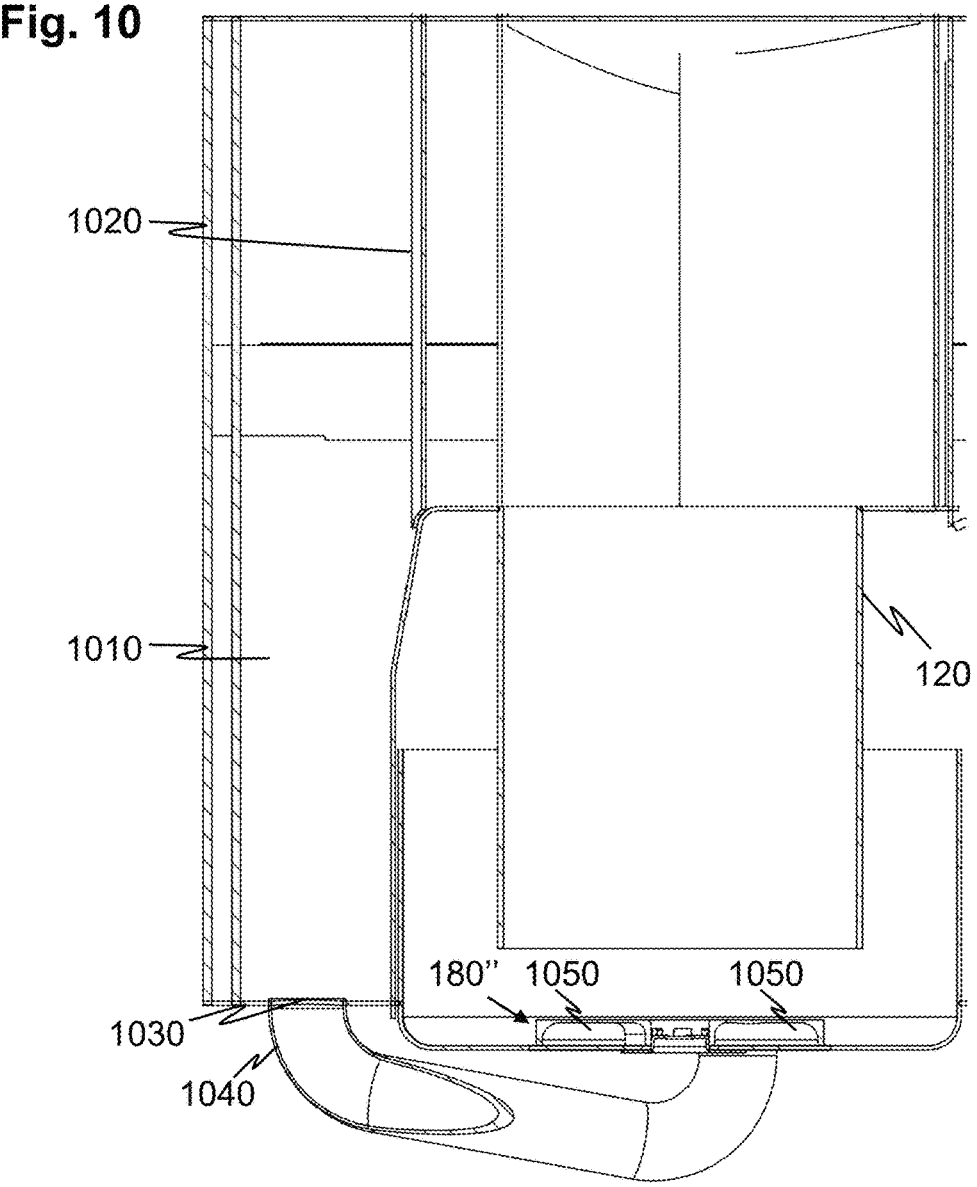
FIG. 10 shows a guide of another example embodiment with an external bypass feed.

FIG. 10 shows a guide 180" of yet another example embodiment with an external bypass feed 1030. Here, an exhaust gas feed line 1010 outputs exhaust gas to the mixing pipe 120 and also via another branch to the guide 180" for forming the carrier flow. The bypassing may increase the pressure of exhaust gas fed to the central opening.

In FIG. 10, there is further a peripheral distribution channel 1050 surrounding the central opening and distributing exhaust gas around the doser tip. As drawn, the peripheral distribution channel may have a greater cross-sectional area at a feed point and a smaller cross-sectional area distantly from the feed point so as to even the distribution of the exhaust gas to the carrier flow around the central opening.

As in the embodiment of FIG. 10, the feed to central opening is provided over both sides without any rotational bias, the blades shown in FIG. 7 may be omitted for reducing pressure loss.

In an example embodiment, the guide is closed except the central opening. In another example embodiment, the guide comprises one or more Venturi input ports (not shown) can be configured to introduce exhaust gas from the mixing chamber, preferably from a peripheral area around the guide.

FIG. 11 shows a flow chart of a method in a mixer according to an example embodiment, comprising:

1100: feeding a rotating flow of the first portion of exhaust gas in the mixing pipe towards a turning end of a mixing chamber;

1101: dosing reactant by a doser against the rotating flow around a centreline of the mixing pipe;

1102: maintaining a guide around the doser such that a front face of the guide faces the rotating flow, and the guide defines a central opening surrounding the doser;

1103: guiding exhaust gas to a carrier flow around the doser via the central opening.

The method may further comprise any one or more of:

1104: upstream from the feeding of the rotating flow of the first portion in the mixing pipe, branching a first portion exhaust gas supply partly to a mixing pipe and a second branch to a carrier flow input;

1105: guiding exhaust gas from the carrier flow input to the carrier flow;

1106: guiding a side flow out of the rotating flow through the central opening to the carrier flow; and/or 1107: inhibiting the turbulence by guiding the side flow via guide channels that feed the side flow by a plurality of radial outputs to the central opening.

In an example embodiment, there is provided a mixer comprising means for performing the method of any example embodiment.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the disclosed embodiments. However, the disclosed embodiments are not restricted to details presented in the foregoing, but implementable in other embodiments using equivalent means or in different combinations of embodiments.

Furthermore, some of the features of the afore-disclosed example embodiments may be used to advantage without the corresponding use of other features. The foregoing shall be considered as merely illustrative of the principles of the present disclosure, and not in limitation, so only the appended claims limit the scope of the disclosed embodiments.

The invention claimed is:

1. A method in a mixer, comprising:
   feeding a rotating flow of exhaust gas in a mixing pipe towards a turning end of a mixing chamber;
   dosing reactant by a doser against the rotating flow around a centreline of the mixing pipe;
   maintaining a guide around the doser such that a front face of the guide faces the rotating flow, and the guide defines a central opening surrounding the doser;
   guiding a side flow out of the rotating flow to a carrier flow around the doser via the central opening; and
   inhibiting by the guide turbulence from being transferred from the side flow to the carrier flow.

2. The method of claim 1, further comprising forming a pressure difference between a periphery of the guide and the mixing chamber around the guide by a geometry of the mixer; and using the pressure difference to perform the guiding of the side flow.

3. The method of claim 1, wherein the front surface of the guide is disposed upstream of the turning end of the mixing chamber.

4. A mixer for exhaust gas aftertreatment, comprising:
   a feed configured to feed a rotating flow of exhaust gas in a mixing pipe towards a turning end of a mixing chamber;
   a doser configured to dose reactant against the rotating flow around a centreline of the mixing pipe;
   a guide around the doser such that a front face of the guide faces the rotating flow, and the guide defines a central opening surrounding the doser;
   the guide comprising a passage structure for guiding a side flow out of the rotating flow to a carrier flow around the doser via the central opening; and
   the passage structure being configured to inhibit turbulence from being transferred from the side flow to the carrier flow.

5. The mixer of claim 4, comprising a geometry configured to form a pressure difference between a periphery of the guide and the mixing chamber around the guide; and the passage structure being configured to guide the side flow using the pressure difference.

6. The mixer of claim 4, wherein the doser is an air-free doser.

7. The mixer of claim 4, wherein the passage structure comprises a plurality of guide channels configured to feed the side flow by a plurality of radial outputs to the central opening.

8. The mixer of claim 4, wherein the guide comprises a disc that in part together with the turning end defines the passage structure.

9. The mixer of claim 4, comprising a plurality of wings radially extending from the central opening, which plurality of wings in part define the passage structure.

10. The mixer of claim 9, wherein the wings have back-side fairings configured to reduce turbulence.

11. The mixer of claim 9, wherein the wings have planar front-sides at an angle with relation to a radial direction such that front-side is turned at a peripheral end towards incoming gas flow.

12. The mixer of claim 9, wherein all or at least some of the wings are inset from a periphery of the guide.

13. The mixer of claim 9, wherein all or at least some of the wings are inset from the central opening.

14. The mixer of claim 9, wherein all or at least some of the wings define fixing holes.

15. The mixer of claim 4, wherein the central opening defines a cylindrical portion.

16. The mixer of claim 4, wherein the central opening defines a conical portion.

17. The mixer of claim 4, wherein the front surface of the guide is disposed upstream of the turning end of the mixing chamber.

* * * * *